Figure 1:
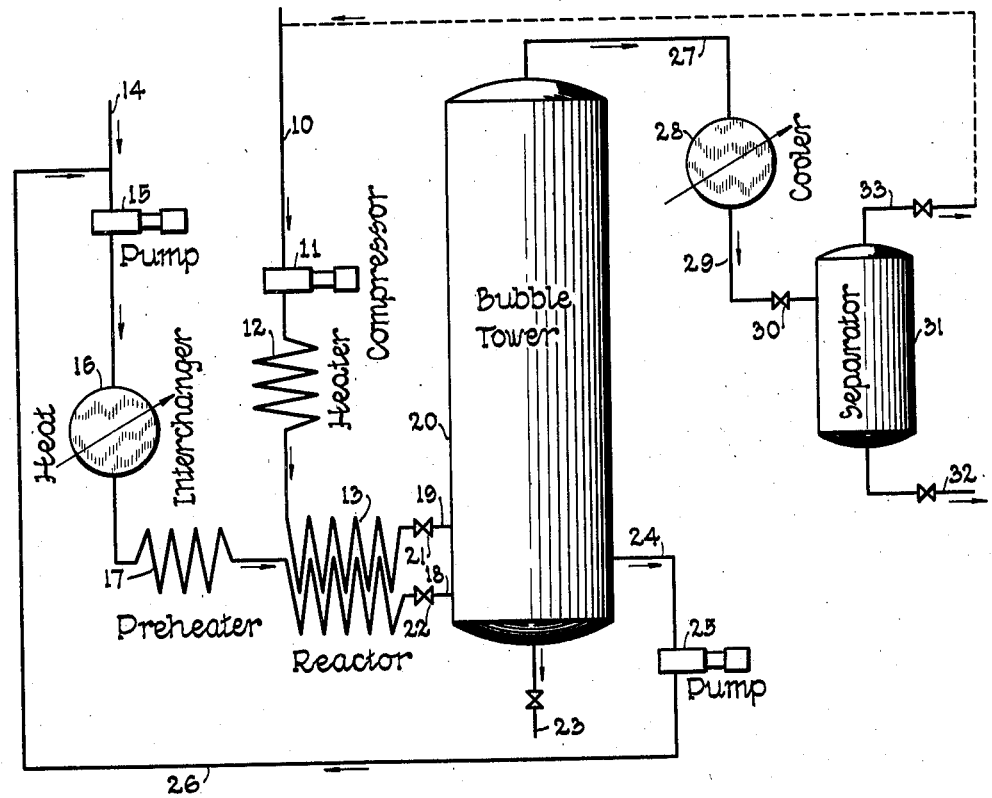

Feb. 12, 1935.  W. B. PLUMMER  1,991,353
PROCESS FOR POLYMERIZING HYDROCARBON GASES
Filed Nov. 25, 1931

Inventor
William B. Plummer
By Bruce. K. Brown Atty.

Patented Feb. 12, 1935

1,991,353

UNITED STATES PATENT OFFICE 1,991,353

PROCESS FOR POLYMERIZING HYDROCARBON GASES

William B. Plummer, Chicago, Ill., assignor to Standard Oil Company, Chicago, Ill., a corporation of Indiana Application November 25, 1931, Serial No. 577,231

6 Claims. (Cl. 196—10)

REISSUED

The present invention relates to an improvement in the art of polymerizing unsaturated gaseous hydrocarbons to low boiling liquid hydrocarbons under high temperatures and pressures, whereby the polymerization temperature is more effectively controlled than has previously been possible.

The fact that gaseous unsaturated hydrocarbons can be polymerized to low boiling liquid hydrocarbons has been known for many years but this process has never been developed commercially. One of the most serious impediments to such commercial development has been the fact that these polymerization reactions are highly exothermic. The reaction must be carried out at temperatures ranging close up to 1000° F., under which conditions spontaneous overheating of the reaction due to its exothermicity leads to the formation of large proportions of undesired products, in particular hydrogen, methane, and carbon. It has been proposed to counteract this tendency by carrying out the polymerization reactions in a pipe heater wherein the flow of reacting gases inside the coils is parallel with the flow of furnace gases outside the coils. By this means, as the reaction tends to overheat, it may lose heat to the relatively cooler furnace gases surrounding the coils. I have found however, that this expedient is not sufficient in many cases to provide suitable control of the reaction temperature.

I have discovered that if such polymerization reactions be carried out in close thermal relationship (but out of direct contact) with a stream or body of oil which is maintained under such pressure as to be susceptible to cracking at the temperature of polymerization reactions, said reaction temperature can be very readily controlled and prevented from rising to an undesirable point due to exothermic development of heat. This is due to the fact that the heat of cracking of the oil is endothermic in character and large in magnitude. The specific heat capacity of the oil would not alone be sufficient to absorb the exothermic heat of the polymerization reactions unless an excessively large amount of oil were present. Furthermore the heat of vaporization of the oil would not be sufficient to absorb the heat evolved by the polymerization, since under cracking conditions the constituents of the oil are in general so near their critical state that the heat of vaporization has become relatively small. Since the endothermic heat of cracking is large, and since the temperature coefficient of the cracking reactions is high in this general temperature range, the temperature of the polymerization reactions cannot rise to an undue extent, since any increase in said temperature produces a corresponding increase in the rate of absorption of heat by the oil due to the rapid increase in the rate of cracking.

Any apparatus whereby oil under cracking conditions and unsaturated gases under polymerizing conditions can be maintained out of contact but in close thermal relationship with each other, is suitable for carrying out my process. For example, the polymerization reactions might be carried out in a coil submerged in oil maintained at cracking conditions in a large pressure vessel. This arrangement has the disadvantage that coke from the cracking of the oil may be deposited on the outside of the polymerization coils, the removal of such coke being difficult. I therefore prefer to carry out my process in apparatus consisting basicly of adjacent banks of tubes, preferably alternately containing oil and gas, these tubes being maintained in close thermal contact by the presence of a thermally conducting medium between them.

Figure 2:
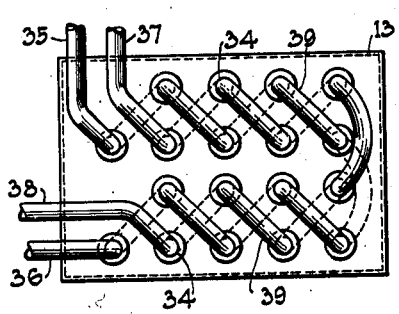
Figure 3:
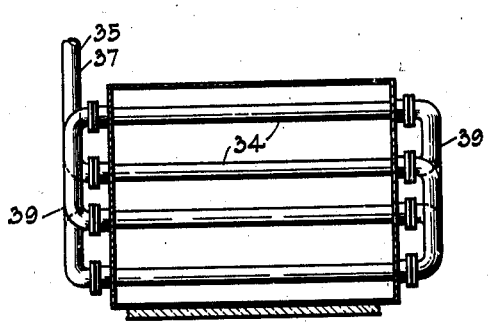

My invention will be clearly understood from the foregoing brief description and from the following detailed discussion of its operation. In the accompanying drawing, which forms a part of this specification, Figure 1 is a diagrammatic representation of the apparatus and set-up for carrying out the process, Figure 2 is a front view of the reactor, and Figure 3 is a side view thereof.

Referring to Figure 1, unsaturated gases from any convenient source enter the system through line 10, are compressed by compressor 11, preheated by heater 12 and injected into reactor 13 at a pressure of 1000-3000 pounds/square inch and a temperature of 800-1000° F. Suitable oil charging stock enters the system through pipe 14 and is pumped by pump 15 through heat interchanger or interchangers 16 and preheater 17. The oil is thus heated to a temperature of 800-1000° F. corresponding to the temperature of the gases undergoing polymerization. The pressure on the oil may range from 100-1000 pounds/square inch, depending on the cracking characteristics of the oil. It will be understood that the heat interchanger 16 may be located at any desired point, for example, in heat interchange relation with materials in pipes 18 or 19 leaving the reactor 13, or in the bubble tower 20.

The reactor 13 will be further described in connection with Figure 2. Oil and its cracking products leave reactor 13 through pipe 18, while polymerization products and unconverted gases leave through pipe 19, the pressure in these lines being reduced by valves 21 and 22 respectively to a pressure of 50–300 pounds/square inch, at which bubble tower 20 operates. The oil cracking products are introduced into the bubble tower 20 at a point near its bottom, while the polymerization products are introduced at a more elevated point. Residual tar and heavy oils are removed by valved draw-off 23 while middle oils are removed from an intermediate point 24 in the tower and are pumped by pump 25 through line 26 whereby such oils are returned to the oil supply pipe 14 of the cracking system. Gases and vapors of light products are removed from the bubble tower through the top off-take 27 and are passed through cooler 28. In line 29 valve 30 reduces the pressure on the cooled products to 50–100 pounds/square inch. Separator 31 operates at this pressure, all liquid products being removed by valved bottom draw-off 32 while uncondensed gases are removed through valved top draw-off 33.

Uncondensed gases may be returned to the polymerization step, may be purified to increase their olefin content prior to so returning them, or may be cracked to increase their olefin content prior to recycling.

The polymerizing-cracking reactor 13 (see Figs. 2 and 3) may consist of an insulated receptacle with closely spaced pipes 34 therein. The oil cracking stock may be introduced by pipe 35 and discharged by pipe 36; the unsaturated gases may be introduced by pipe 37 and the polymerized products discharged by pipe 38. In each case a single conduit is formed by the pipes which are connected by return bends 39, which are removable to facilitate cleaning of the tubes. The only fixed requirement on the construction and arrangement of the reactor is that the oil cracking tubes and the gas polymerizing tubes shall be in close thermal contact with each other. In apparatus designed to operate at or about the maximum contemplated temperature of 1000° it may be sufficient to arrange the tubes in close juxtaposition to each other in a simple heat-insulated chamber, since at these temperatures the rate of heat transfer by radiation through gases may be sufficiently rapid for the present purposes. It may be necessary, especially at lower temperatures, to provide more intimate thermal contact between the tubes; this may be accomplished by surrounding the tubes with a cast billet or a bath of molten alloy. I prefer to surround the tubes with a metal conductive medium such as cast aluminum, which has a melting point above the reaction temperatures and which combines the advantages of high conductivity and lightness. If higher melting point metals are used there may be danger of melting the tubes in casting. Low melting alloys are satisfactory except for structural difficulties (the cast aluminum would be in the form of a solid billet). It will be possible, if so desired, to construct the reactor by boring or casting closely adjacent holes in a large block of metal and suitably cross-connecting said holes or conduits with return bends, or by covering the ends of the whole block with heads containing suitable connecting passages integrally disposed therein.

It will be obvious that my improved process not only provides an improved means for heat control in polymerization, but also promotes economies of heat in the oil cracking operation, as well as further economies which are realized by the joint utilization of apparatus in both systems.

While the foregoing is a full and complete description of my invention it will be understood that I am not limited therein except as defined by the following claims:

I claim:

1. In polymerizing gaseous unsaturated hydrocarbons at pressures of 1,000–3,000 pounds per square inch, and temperatures of 800–1,000° F., the method of controlling the polymerization temperature in an elongated tubular polymerization zone which comprises transferring heat therefrom to a body of oil at about the same temperature but at a different pressure whereby the exothermic heat of polymerization is utilized to supply the endothermic heat of cracking.

2. The process for polymerizing gaseous unsaturated hydrocarbons at 1,000–3,000 pounds per square inch and 800–1,000° F., in a continuous manner which comprises passing said hydrocarbons through an elongated tubular polymerization zone, passing a stream of oil through an elongated tubular cracking zone under cracking conditions of temperature and pressure, and transferring heat from one zone to the other whereby the exothermic heat of polymerization is utilized to promote cracking, thereby stabilizing polymerization temperature.

3. The process of obtaining low boiling hydrocarbon oils which comprises compressing unsaturated gases to pressures of 1,000–3,000 pounds per square inch, heating said compressed gases to a temperature of 800–1,000° F., passing said compressed gases through an elongated tubular polymerization zone, heating a hydrocarbon oil heavier than gasoline to about the same temperature at a lower pressure, passing said oil through a cracking zone, maintaining said polymerization zone and said cracking zone in heat exchange relation with each other, introducing the products from each zone into a single fractionating tower, and separating the desired low boiling hydrocarbon oils from lighter and heavier products.

4. The process of claim 3 wherein the lighter products are returned to be recompressed and reheated in the polymerization treatment.

5. In combination, means for compressing unsaturated hydrocarbon gases to 1000–3000 pounds/square inch, means for heating said compressed gases to 800–1000° F., means for heating an oil heavier than gasoline to an equivalent temperature, an elongated gas polymerization reaction system and an elongated oil cracking reaction system adjacent thereto and in close thermal contact therewith, means for passing said heated gases and said heated oil through said reaction systems respectively, a fractionating tower, means for passing products from both said systems into said fractionating tower, means for withdrawing oils heavier than gasoline from said tower and for returning said oils to the oil heating means, means for withdrawing gases and vapors from said tower, means for cooling said gases and vapors, and means for separating condensed low boiling hydrocarbons from uncondensed gases.

6. In apparatus as defined in claim 5, in addition, means for returning a part of the final uncondensed gases to the unsaturated gas compressing means.

WILLIAM B. PLUMMER.